(12) United States Patent
Bertram et al.

(10) Patent No.: US 6,801,015 B2
(45) Date of Patent: Oct. 5, 2004

(54) METHOD AND CIRCUIT ARRANGEMENT FOR PREVENTING THE STAND-BY DISCHARGE OF A BATTERY-POWERED SIGNAL EVALUATION CIRCUIT OF A SENSOR

(75) Inventors: Andre Bertram, Bielefeld (DE); Guenther Ennen, Enger (DE); Stefan Tiekoetter, Bielefeld (DE)

(73) Assignee: Miele & Cie. KG., Guetersloh (DE)

( * ) Notice: Subject to any disclaimer, the term of this patent is extended or adjusted under 35 U.S.C. 154(b) by 69 days.

(21) Appl. No.: 10/345,687

(22) Filed: Jan. 16, 2003

(65) Prior Publication Data

US 2003/0146739 A1 Aug. 7, 2003

(30) Foreign Application Priority Data

Feb. 1, 2002 (DE) .......................................... 102 04 070

(51) Int. Cl.[7] ......................... H01M 10/44; H01M 10/46
(52) U.S. Cl. ....................................................... 320/127
(58) Field of Search ................................ 320/114, 115, 320/125, 127, 129, 132; 15/339

(56) References Cited

U.S. PATENT DOCUMENTS

| 4,782,241 A | * | 11/1988 | Baker et al. ................... 307/66 |
| 6,199,244 B1 | | 3/2001 | Hilgers et al. ................. 15/339 |
| 6,340,879 B1 | * | 1/2002 | Blacker ....................... 320/153 |
| 2003/0085621 A1 | * | 5/2003 | Potega ........................ 307/18 |

FOREIGN PATENT DOCUMENTS

| WO | WO 95/30887 | 11/1995 | .......... G01N/15/00 |

* cited by examiner

*Primary Examiner*—Edward H. Tso
(74) *Attorney, Agent, or Firm*—Karl Hormann

(57) ABSTRACT

A circuit arrangement for preventing the discharge of a battery powering a signal evaluation circuit while the circuit is in a stand-by mode, provided with a sensor for generating signals and means responsive to the generation of signals for connecting the battery to the signal evaluation circuit and for disconnecting the battery in the absence of signals. The signal responsive means include an amplifier for triggering a monostable flip flop the output of which controls the conductivity of a transistor between the battery and the signal evaluation circuit.

15 Claims, 2 Drawing Sheets

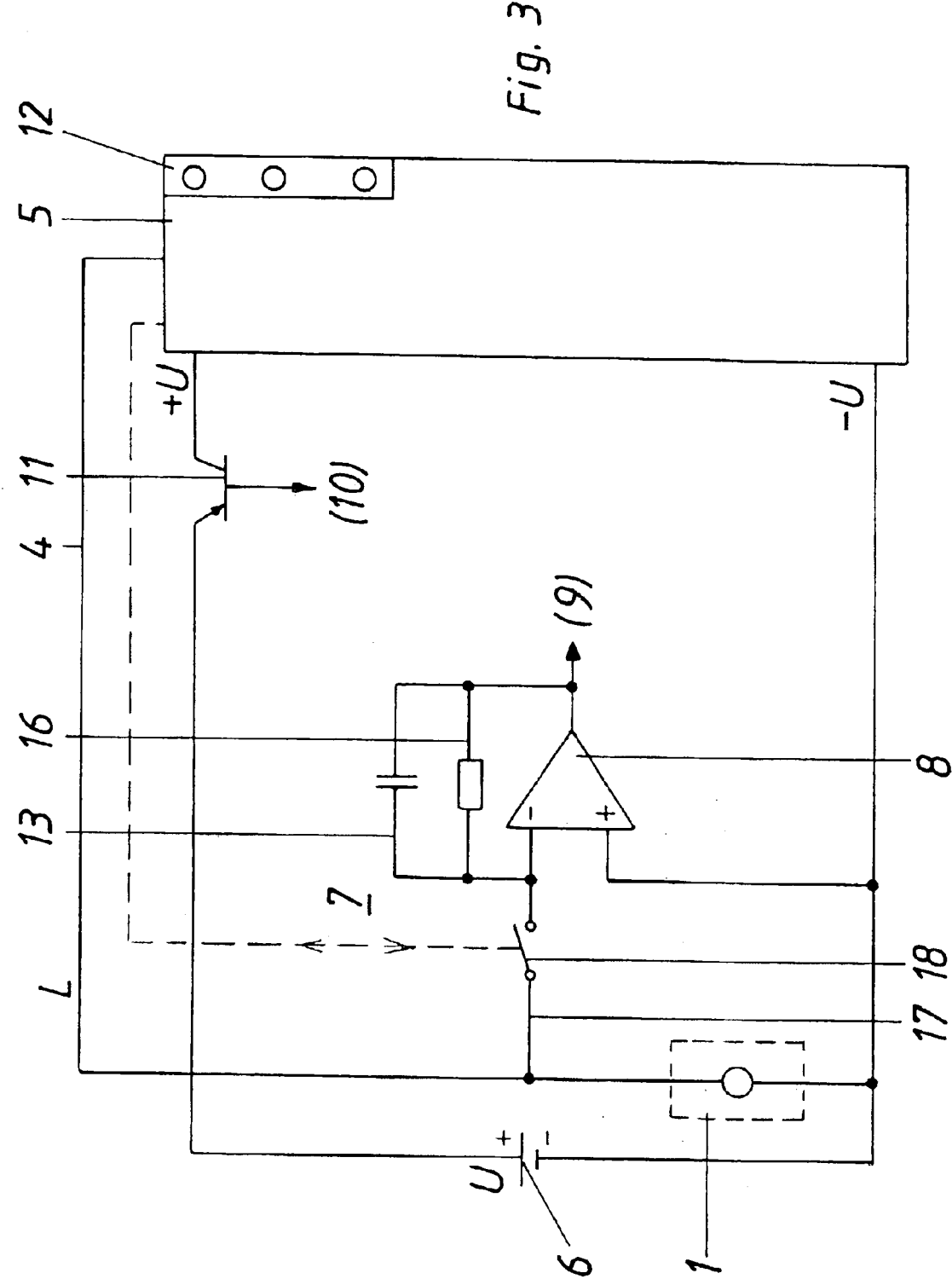

METHOD AND CIRCUIT ARRANGEMENT FOR PREVENTING THE STAND-BY DISCHARGE OF A BATTERY-POWERED SIGNAL EVALUATION CIRCUIT OF A SENSOR

BACKGROUND OF THE INVENTION

1. Field of the Invention

The invention, in general, relates to a method of preventing the discharge of a battery powering an evaluation circuit of charge signals from sensors when in a stand-by mode and, more particularly, to such a method as applied to dust sensors of vacuum cleaners. Furthermore, the invention relates to a circuit capable of executing such a method.

2. The Prior Art

Laid-open international patent specification WO 95/30887=PCT/EP 95/01529 (designating the U.S.) discloses a method of detecting dust particles by means of a signal evaluation circuit of a dust sensor of a vacuum cleaner in which both the circuit and the sensor are powered by a battery. The signal evaluation circuit, which receives charge signals from a piezo-ceramic dust sensor located in the floor nozzle of the vacuum cleaner, in essence consists of a signal amplifier with associated signal filters, threshold value detectors and other electronic components which in the idle state of the vacuum cleaner are continuously energized by voltage from a battery. In the stand-by mode of the vacuum cleaner, i.e. during intermissions when it is not drawing dust, the known circuit arrangement is thus drawing substantial idle currents (in the order of about 10 mA) which, over time, results in a quick discharge of the battery.

In the context of a sensor arrangement of a vacuum cleaner it is also known to prevent an idle state discharge by means of a mechanical vacuum pressure switch. Whenever the vacuum cleaner is operating the vacuum pressure switch is actuated to connect the sensor unit to its source of operating voltage. Such an arrangement suffers from the drawbacks that the vacuum pressure switch is not only subject to considerable mechanical wear and tear in its current supply on-off operation, but that it also requires its own mounting space at the exterior of the electronic circuit.

OBJECT OF THE INVENTION

It is an object of the invention to provide a method of preventing the discharge of battery powering a circuit for evaluating signals indicative of dust when in its standby mode of operation.

A more particular object of the invention resides in providing a method of the kind referred to which requires no mechanical action for intermittently energizing and deenergizing a signal evaluation circuit.

Yet another object of the invention resides in the provision of an intermittently active power supply circuit integrated into an evaluation circuit of the kind referred to for preventing the discharge of a battery powering the evaluation circuit when in its standby mode of operation.

BRIEF SUMMARY OF THE INVENTION

In the accomplishment of these and other objects the invention provides for a method of preventing the discharge of a battery powering a signal evaluation circuit of a sensor by utilizing signals generated by the sensor for connecting the power supply battery to the signal evaluation circuit and for disconnecting the power supply during the absence of charge signals.

Advantageously, the method makes use of a signal evaluation circuit arrangement incorporating a transistor as a mains switching element in the power supply circuit.

Other objects will in part be obvious and will in part appear hereinafter.

By utilizing charge signals when they occur to connect the current supply to the signal evaluation circuit and by disconnecting the current supply in the absence of any such signals, elector-mechanical switches and, more particularly, deteriorating mechanical vacuum pressure switches can be dispensed with. Thus, a cost-efficient compact electronic switching arrangement may be realized without any need for mounting it at a predetermined position. Such an arrangement, because of its mains or network switching function, ensures a long life for the battery of an evaluation circuit in a stand-by mode.

DESCRIPTION OF THE SEVERAL DRAWINGS

The novel features which are considered to be characteristic of the invention are set forth with particularity in the appended claims. The invention itself, however, in respect of its structure, construction and lay-out as well as manufacturing techniques, together with other objects and advantages thereof, will be best understood from the following description of preferred embodiments when read in connection with the appended drawings, in which:

FIG. 3 is a simplified rendition of the electrical circuit of FIG. 2 with an additional decoupling switch.

DETAILED DESCRIPTION OF THE PREFERRED EMBODIMENTS

Figure 1:
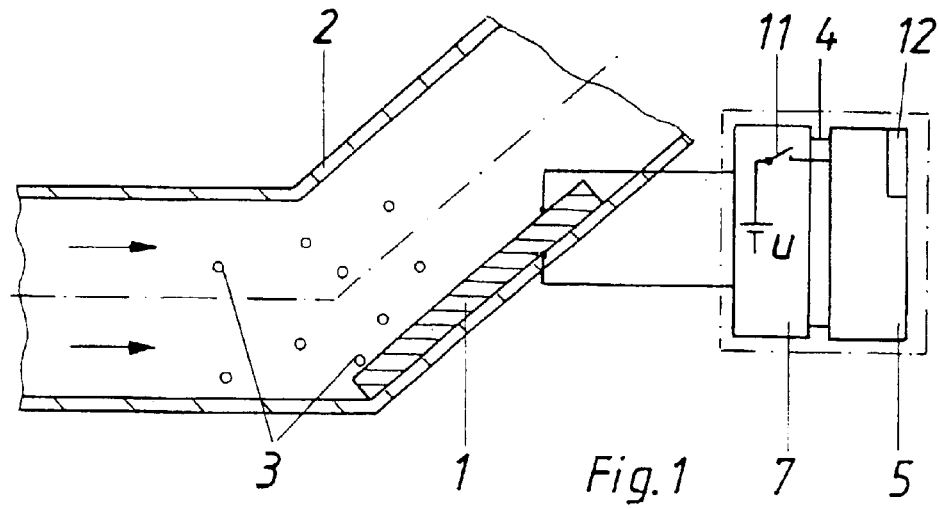
FIG. 1 depicts the arrangement of a piezo-electric dust sensor in the suction channel of a vacuum cleaner floor nozzle with a signal evaluation circuit and associated current supply switching circuit connected to the dust sensor.

FIG. 1 schematically shows a piezo-electric dust sensor 1 disposed in the suction tube, and more particularly in an angled connection tube 2 of a floor nozzle of a vacuum cleaner (neither shown). Any dust 3 taken up by the floor nozzle during operation is moved through the connection tube 2 in a direction of flow indicated by arrows. In the area of the bent section of the connection tube 2 dust particles 3 impinge upon the piezo-electric dust sensor 1 mounted at that location. The sensor 1 converts the kinetic energy or pulse change of the impinging dust particles 3 into a corresponding electric signal, hereinafter referred to as a "charge signal". The charge signal L is fed by way of a bus line 4 to a signal evaluation circuit 5 the operating voltage of which (voltage U from a battery 6) is supplied from a current supply switching circuit 7. The current supply switching circuit 7 including the dust sensor 1 is always connected to the battery 6 (see also FIG. 2).

Figure 2:
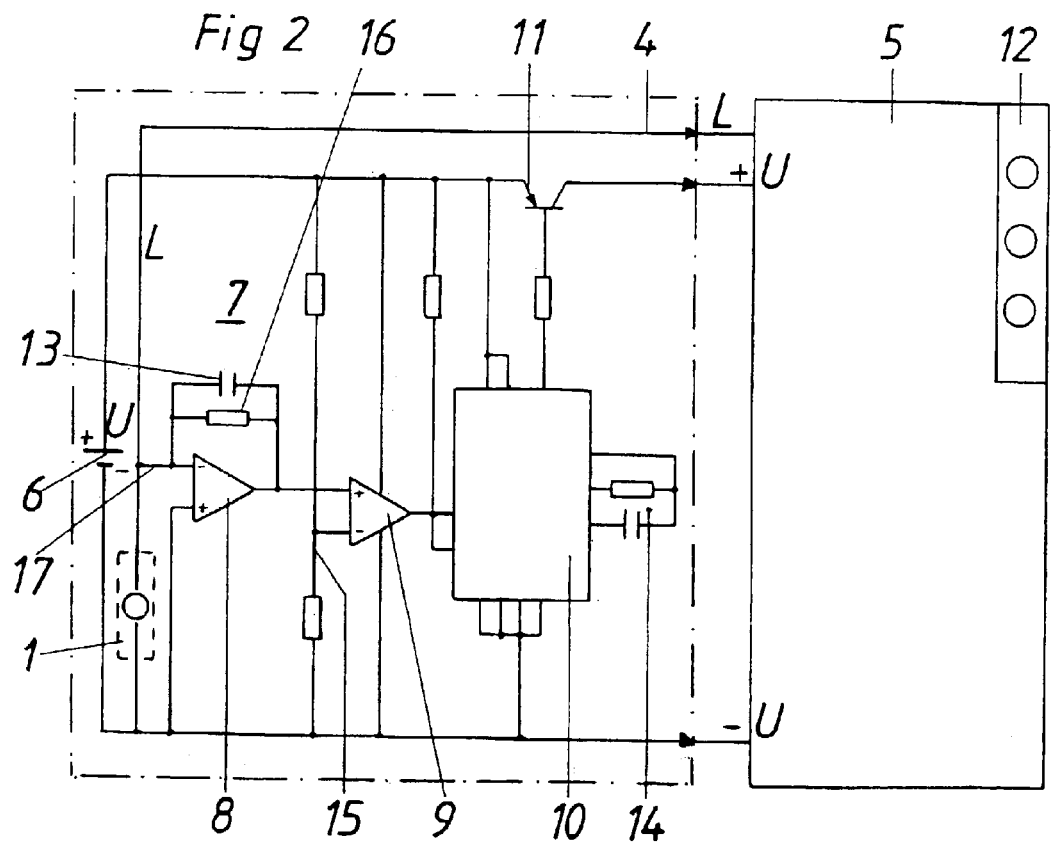
FIG. 2 is a detailed view of the current supply switching circuit including a dust sensor as well as a simplified block circuit diagram of the signal evaluation circuit.

FIG. 2 is a simplified block circuit diagram of the signal evaluation circuit 5. Its structure and function are not unlike those of the measurement circuit disclosed by laid-open international patent specification WO 95/30887, supra. The known circuit is also powered by a battery. However, the current supply switching circuit 7 shown in detail in FIG. 2 including the dust sensor 1 for the signal evaluation circuit 5 is structured to function in the manner of a mains power switch. When dust particles are detected the switch energizes the signal evaluation circuit 5 with battery voltage U and puts it into its stand-by mode when no dust particles 3 are detected.

In accordance with the invention, discharge of the battery powering the signal evaluation circuit 5 when in its standby mode is thus prevented by charge signals L from the sensor 1 being utilized to turn on the current supply of the signal evaluation circuit 5, while the absence of such charge signals L causes the power supply to be disconnected. Turning on and off of the current supply is controlled as a function of the values of amplitude of the charge signals L from the dust sensor 1. The threshold values or sensitivities of the amplifiers may be adjusted. Connecting and disconnecting the battery voltage U with respect to the signal evaluation circuit 5 depend upon the temporal course or occurrence of consecutive charge signals L derived from the piezo-electrical dust sensor 1. These charge or trigger signals L are fed to the signal evaluation circuit 5 and, separately, by way of a connecting line 17, to the current supply switching circuit 7 shown in FIG. 2.

As shown in the circuit arrangement of FIG. 2, the dust sensor 1 is located in the current supply switching circuit 7 which is continuously energized by battery voltage U. The current supply switching circuit 7 is provided with a charge signal amplifier 8 and, at the output thereof, with a comparator 9 for processing the charge signals L derived from the dust sensor 1 via the bus line 4 or the connecting line 17. The processed charge signals L are fed to a mono-stable flip-flop 10 the output of which turns a transistor 11 on or off. The transistor 11 energizes or deenergizes the signal evaluation circuit 5 with battery voltage U. The charge signals L from the bus line 4 are also fed to the signal evaluation circuit 5 which during operation of the vacuum cleaner keeps its user informed, by way of an indicator 12, of the results of the vacuuming action. The indicator 12 may emit acoustic or optical signals indicative of dust particles.

Depending upon sensitivity—which may be set by way of an RC circuit consisting of a shunt capacitor 13 and a shunt resistor 16—the charge signal amplifier 8 detects the operating noise of the vacuum cleaner and impinging dust particles. 3. The comparator 9 converts the noisy output signal of the charge signal amplifier 8 into a square wave which, in turn, trigger the monostable flip-flop 10. The monostable flip-flop 10 turns on the transistor 11 for a time set by the resistor-capacitor combination 14 (e.g. 1 second), to energize the signal evaluation circuit 5 with battery voltage U. As long as the dust sensor 1 delivers signals, the flip-flop 10 will be continuously triggered thus permanently recommencing the operating time. When no more signals are received, the voltage to the signal evaluation circuit 5 is interrupted, preferably after about 1 second. The reset period of the monostable flip-flop 10 of the current supply switching circuit 7 may be varied by changing the values of the resistance and capacitance 14. The sensitivity (switching threshold) of the amplified charge signals L (or trigger signals) may be adjusted by a voltage divider 15 connected to the battery 6.

In accordance with an advantageous embodiment of the invention and as shown in FIG. 3, the connecting line 17 connected to the charge signal amplifier 8 and extending from the bus line 4 may also be provided with a decoupling switch 18 which is actuated by the electronic controls of the vacuum cleaner. The switch 18 may either be a transistor or a relay contact. During the stand-by mode the switch 18 is closed. When dust signals are received, the comparator 9 will energize the flip-flop 10 and the indicator 12 for a first time for about 1 to 2 seconds. In the energized state of the flip-flop 10 the switch 18 is opened and the charge amplifier 8 receives no more signals L from the sensor. Upon expiry of its energized state, the flip-flop 10 will switch off the battery-powered signal evaluation circuit 5. The switch 18 will close again and triggering of the monostable flip-flop 10 recommences. This variant of the invention leads to favorable characteristics in the de-coupling of the charge amplifier 8 and electronic circuitry. As will be appreciated by those skilled in the art, the switch could be connected to the bus line 4 instead; or each line 4 and 17 could be provided with its own switch of the kind referred to.

With a 6 volt battery voltage, the no-load current absorption detected during a test conducted with the circuit arrangement in accordance with the invention yielded a current value of 70 micro amperes. In the test, the charge signal amplifier of the current supply switching circuit was advantageously structured as a multiple stage operational amplifier (e.g. a dual-stage amplifier). Using four 1.5 Volt batteries of a capacity of about 2 Ah and an effective vacuuming time of the vacuum cleaner of 50 hours per year, and assuming an average current absorption of 30 mA depending upon the number of indicator lamps of the energized indicator device 12 of the signal evaluation circuit 5, the resultant battery life is about one and a half years. The low current absorption of about 70 $\mu$A of the current supply switching circuit 7 is the result of low and micro power semiconductors in the circuitry.

The invention allows fabrication of cost-efficient electronic circuitry which may be mounted, without requiring much space and independently of a given location, in a vacuum cleaner or a dust nozzle thereof, or even in the handle of the vacuum cleaner. The inventive mains switching function of the current supply switching circuit 7 for the signal evaluation circuit 5 results in long battery life in the stand-by mode thereof. With suitably adapted circuitry, the piezo-electric dust sensor 1 may be replaced by a photoelectric or opto-electronic dust sensor. Of course, the invention may be applied with equal advantage to other battery-powered electronic circuits for sensors generating signals suitable for triggering circuit components.

What is claimed is:

1. A method of preventing the discharge of a battery during intermittent stand-by modes of a signal evaluation circuit, comprising the steps of:

generating signals derived from a sensor;

feeding the signals to a power supply switching circuit;

switching the power supply switching circuit in response to the signals to connect the battery to the signal evaluation circuit and to disconnect the battery in the absence of the signals.

2. The method of claim 1, wherein the power supply switching circuit connects the battery to the signal evaluation circuit in response to signals of a predetermined amplitude.

3. The method of claim 1, further including the step of adjusting the sensitivity of the power supply switching circuit relative to the signal strength.

4. The method of claim 1, further including the step of switching the power supply switching circuit as a function of the temporal sequence of the signals.

5. The method of claim 1, wherein the signals are generated in response to dust particles impinging upon the sensor.

6. A circuit arrangement for preventing, during a stand-by mode of a signal evaluation circuit, the discharge of a battery energizing the evaluation circuit, comprising:

a sensor for selectively generating signals;

a power supply switching circuit connected to the battery and responsive to generated signals to connect the battery to the signal evaluation circuit and to disconnect the battery from the signal evaluation circuit in the absence of signals.

7. The circuit arrangement of claim 6, wherein the power supply circuit includes a switching element disposed in the power mains of the signal evaluation circuit.

8. The circuit arrangement of claim 7, wherein the switching element is a transistor.

9. The circuit arrangement of claim 8, wherein the sensor is connected to the power supply switching circuit by an amplifier the output of which is connected to a monostable flip flop for triggering the transistor.

10. The circuit arrangement of claim 9, wherein the output of the amplifier may be modified by an R-C circuit.

11. The circuit arrangement of claim 9, wherein the output of the amplifier is connected to the monostable flip flop through a comparator for processing signals.

12. The circuit arrangement of claim 11, wherein the output of the sensor is connected to a voltage divider for adjusting the input to the comparator.

13. The circuit arrangement of claim 9, wherein for adjustment of its reset period the monostable flip flop is provided with an R-C circuit.

14. The circuit arrangement of claim 9, further comprising at least one decoupling switch between the sensor and the amplifier.

15. The circuit arrangement of claim 9, wherein the amplifier is a multistage operational amplifier.

* * * * *